US008567727B2

(12) United States Patent
Morris

(10) Patent No.: US 8,567,727 B2
(45) Date of Patent: Oct. 29, 2013

(54) TRAILING EDGE FLAP

(75) Inventor: Stuart Morris, Bristol (GB)

(73) Assignee: Airbus Operations Limited, Bristol (GB)

( * ) Notice: Subject to any disclaimer, the term of this patent is extended or adjusted under 35 U.S.C. 154(b) by 127 days.

(21) Appl. No.: 12/939,221

(22) Filed: Nov. 4, 2010

(65) Prior Publication Data
US 2011/0127387 A1 Jun. 2, 2011

(30) Foreign Application Priority Data

Nov. 30, 2009 (GB) .................................. 0921007.1

(51) Int. Cl.
*B64C 9/20* (2006.01)
(52) U.S. Cl.
USPC ........... 244/217; 244/215; 244/213; 244/212; 244/211; 244/216
(58) Field of Classification Search
USPC .......................................... 244/211–217, 219
See application file for complete search history.

(56) References Cited

U.S. PATENT DOCUMENTS

| 2,137,879 | A | * | 11/1938 | Ksoll | 244/216 |
| 2,146,014 | A | * | 2/1939 | Grant | 244/216 |
| 2,222,187 | A | * | 11/1940 | Weatherbee | 244/216 |
| 2,254,304 | A | * | 9/1941 | Miller | 244/216 |
| 2,591,000 | A | * | 4/1952 | O'Brien | 244/216 |
| 3,721,406 | A | * | 3/1973 | Hurlbert | 244/216 |
| 3,819,133 | A | * | 6/1974 | Lee | 244/216 |
| 3,977,630 | A | * | 8/1976 | Lewis et al. | 244/216 |
| 4,049,219 | A | * | 9/1977 | Dean et al. | 244/217 |
| 4,117,996 | A | * | 10/1978 | Sherman | 244/212 |
| 4,702,442 | A | * | 10/1987 | Weiland et al. | 244/216 |
| 4,796,840 | A | * | 1/1989 | Heynatz | 244/215 |
| 5,054,721 | A | * | 10/1991 | Brenholt | 244/207 |
| 5,098,043 | A | * | 3/1992 | Arena | 244/215 |
| 5,651,513 | A | * | 7/1997 | Arena | 244/215 |
| 6,123,297 | A | * | 9/2000 | Berry | 244/214 |
| 7,367,532 | B2 | * | 5/2008 | Libby | 244/216 |
| 7,520,471 | B2 | * | 4/2009 | Reckzeh et al. | 244/215 |

FOREIGN PATENT DOCUMENTS

DE 2050808 A1 4/1972
GB 558047 12/1943
(Continued)

OTHER PUBLICATIONS

UK Search Report for Application No. GB0921007.1 mailed Mar. 4, 2010.

*Primary Examiner* — Tien Dinh
*Assistant Examiner* — Steven Hawk
(74) *Attorney, Agent, or Firm* — Lowe Hauptman & Ham, LLP

(57) ABSTRACT

A trailing edge flap arrangement for an aircraft wing, comprising an array of flap elements each discretely moveable between a retracted and an extended position by a respective actuator, wherein the flap elements are arranged to be deployed so as to open up a through slot between an adjacent pair of the flap elements only when the aerodynamic leading element of the pair has reached its extended position. Also, a method of operating the trailing edge flap arrangement.

15 Claims, 3 Drawing Sheets

(56) References Cited

U.S. PATENT DOCUMENTS

| | | | |
|---|---|---|---|
| 7,600,718 B2 * | 10/2009 | Perez-Sanchez | 244/215 |
| 7,661,630 B2 * | 2/2010 | Libby | 244/216 |
| 7,891,611 B2 * | 2/2011 | Huynh et al. | 244/215 |
| 2005/0230565 A1 * | 10/2005 | Kallinen | 244/217 |
| 2009/0108142 A1 * | 4/2009 | Wright et al. | 244/215 |
| 2010/0059633 A1 * | 3/2010 | Pohl | 244/215 |
| 2010/0286849 A1 * | 11/2010 | Huynh et al. | 244/215 |
| 2010/0308162 A1 * | 12/2010 | Gartelmann | 244/99.3 |

FOREIGN PATENT DOCUMENTS

| | | |
|---|---|---|
| GB | 1547901 | 6/1979 |
| GB | 2073681 A | 10/1981 |
| WO | 2009065597 A1 | 5/2009 |

* cited by examiner

TRAILING EDGE FLAP

RELATED APPLICATIONS

The present application is based on, and claims priority from, Great Britain Application Number 0921007.1, filed Nov. 30, 2009, the disclosure of which is hereby incorporated by reference herein in its entirety.

FIELD OF THE INVENTION

The present invention relates to a trailing edge flap arrangement for an aircraft wing. The invention also relates to a method of operating a trailing edge flap arrangement.

BACKGROUND OF THE INVENTION

Aircraft wing trailing edge flaps are high lift devices which are typically deployed on take-off and landing to increase the lift coefficient by increasing the camber of the wing aerofoil. This can be achieved by rotating the flap downwardly about its hinge line with respect to the fixed wing portion. Some flaps, for example the Fowler flap, further increase the lift generated by the wing by also increasing the planform area of the wing. This is achieved by moving the flap along a track such that the flap moves aft and rotates downwardly when deployed. A "drop hinge flap" is a further type of flap having a hinge point typically below the fixed wing trailing edge, such that the flap moves aft and down with respect to the fixed wing as it rotates downwardly about its hinge point.

A single slotted flap arrangement is generally preferred as this provides a simple, lightweight solution. These are beneficial for take-off but suffer performance losses at the higher deflections required for landing. Within an aircraft family, these performance losses can be acceptable on lightweight variants but higher weight variants may demand double or triple slotted flap arrangements to generate the necessary lift. Many multi-slotted flap arrangements are known but drop hinge flap arrangements conventionally provide only a single slot due to their single hinge point. Accordingly, it can be necessary for aircraft manufacturers to adopt a completely different flap arrangement for use on higher weight aircraft variants within a family, which is undesirable.

SUMMARY OF THE INVENTION

A first aspect of the invention provides a trailing edge flap arrangement for an aircraft wing, comprising an array of flap elements each discretely moveable between a retracted and an extended position by a respective actuator, wherein the flap elements are arranged to be deployed so as to open up a through slot between an adjacent pair of the flap elements only when the aerodynamic leading element of the pair has reached its extended position.

A further aspect of the invention provides a method of operating a trailing edge flap arrangement on an aircraft wing, the flap arrangement including an array of flap elements each discretely moveable between a retracted and an extended position by a respective actuator, the method comprising deploying the flap elements so as to open up a through slot between an adjacent pair of the flap elements only when the aerodynamic leading element of the pair has reached its extended position.

The term "aerodynamic leading element" refers to that flap element which is further forward with respect to the air flowing over the flap arrangement when in use on an aircraft.

The invention is advantageous in that the array of flap elements can be moved collectively, sealed together, to open up a single through slot between the main fixed portion of the aircraft wing and the array of flap elements. The flap arrangement can therefore be deployed like a standard single slotted flap with beneficial low drag characteristics. However, when the flap elements are deployed to open up a slot between adjacent flap elements, the lifting potential of the flap arrangement can be significantly improved without much of the complexity typically associated with multi-slotted flap arrangements.

In a preferred embodiment, the or each adjacent pair of flap elements are moveable between a first position in which the flap elements are sealed together, and a second position in which a slot is opened up between the flap elements. The flap elements are discretely moveable between the first and second positions.

The flap arrangement may be used with either a kinematic track or linkage arrangement. The flap elements may be supported by the track, or by the linkage arrangement, from the aircraft wing for movement relative to the wing. In a preferred embodiment, the linkage arrangement includes a plurality of flap supports each for supporting a respective flap element. Each flap support has a respective hinge point. The foremost flap support is pivotally connectable about its hinge point to a fixed strut mounted on the main fixed wing portion. The flap supports are pivotally connected to one another about their hinge points.

Each flap element is moveable by a respective actuator. The actuator may be a linear actuator. The linear actuator may be connected between adjacent flap supports. In particular, the linear actuator may be pivotally connected at each end to the flap supports over the hinge point which pivotally connects the flap supports. Alternatively, a rotary actuator may be provided at each hinge point.

The method may further comprise: adjusting the flap arrangement to a first configuration in which the array of flap elements are sealed together and in their retracted position.

The method may further comprise: adjusting the flap arrangement to a second configuration in which the array of flap elements are sealed together and the aerodynamic leading flap element in the array is in its extended position so as to provide a single slotted flap.

The method may further comprise: adjusting the flap arrangement to a third configuration in which each of the flap elements are in their extended position so as to provide a multi-slotted flap, with a through slot between each adjacent pair of the elements.

The flap arrangement is preferably in the first configuration during cruise, in the second configuration during take off, and in the third configuration during landing.

In a preferred embodiment, the array includes three flap elements arranged to provide a single, double or triple slotted flap depending on the position of the flap elements. However, the array may include just two, or four or more flap elements. The number of slots available in the flap arrangement is equivalent to the number of flap elements. Therefore a two flap element array can provide single slotted and double slotted settings.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
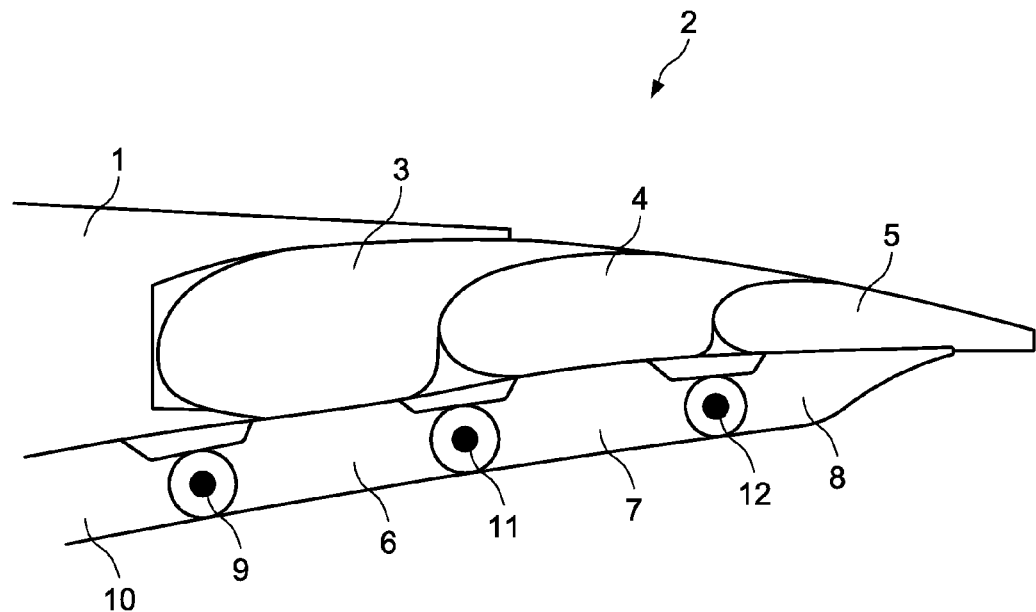
FIG. 1 illustrates a flap arrangement in a retracted configuration.

FIG. 1 shows an aircraft wing including a main fixed wing portion 1 and a trailing edge flap arrangement 2. The flap arrangement 2 includes an array of flap elements comprising a leading flap element 3, an intermediate flap element 4 and a trailing flap element 5.

Each flap element 3, 4, 5 is supported by a respective flap support 6, 7, 8. The flap elements are fixedly mounted on their respective flap supports. The leading flap support 6 is pivotally connected about a leading hinge point 9 to a fixed strut 10. The fixed strut is mounted on the fixed wing portion 1. The intermediate flap support 7 is pivotally connected about an intermediate hinge point 11 to the leading flap support 6. The trailing flap support 8 is pivotally connected about a trailing hinge point 12 to the intermediate flap support 7. The hinge points 9, 11, 12 are located forward and below their respective flap elements 3, 4, 5.

FIG. 1 shows the flap arrangement 2 in its retracted position. The array of flap elements 3, 4, 5 are sealed together and the leading flap element 3 is stowed, tucked against the trailing edge of the fixed wing portion 1. When sealed together, the array of flap elements 3, 4, 5 together form a single flap aerofoil profile.

Figure 2:
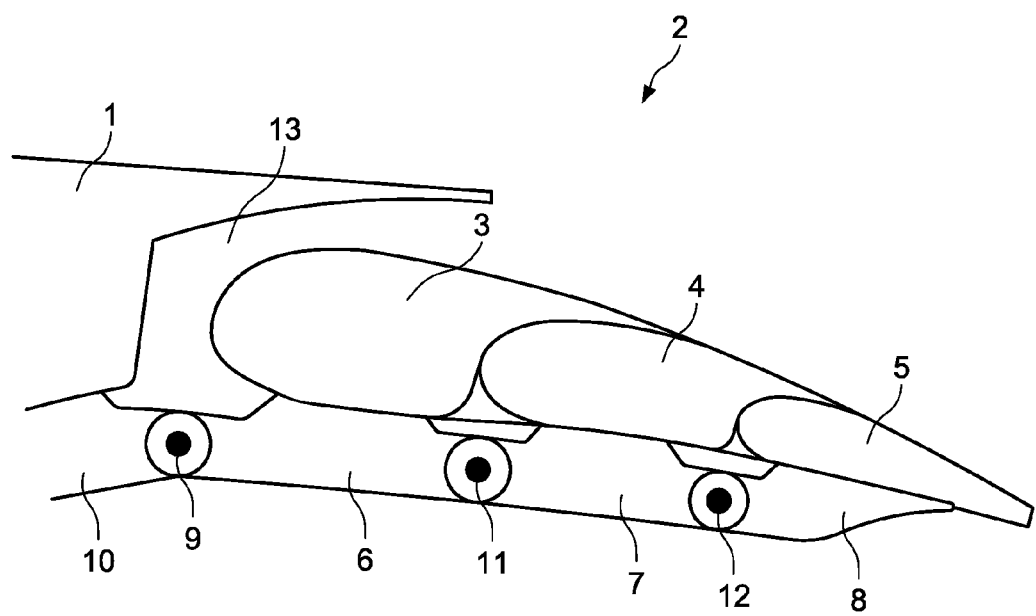
FIG. 2 illustrates the flap arrangement in a single slotted configuration.

FIG. 2 illustrates the flap arrangement 2 in a single slotted configuration. The array of flap elements 3, 4, 5 remain sealed together as a single flap profile which is deployed by rotating leading flap support 6 downwardly about leading hinge point 9. The hinge point 9 therefore functions as a drop hinge in a similar manner to a standard drop hinge flap arrangement. No rotation about hinge points 11 and 12 occurs in moving from the retracted to the single slotted configuration. A through slot 13 is opened up between the fixed wing portion 1 and the leading flap element 3 by rotation about hinge point 9. The single slotted flap configuration shown in FIG. 2 enables high pressure air from the lower wing surface to pass through the slot 13 to energise the boundary layer over the upper surface of the array of flap elements 3, 4, 5 so as to postpone stall in a conventional manner.

Figure 3:
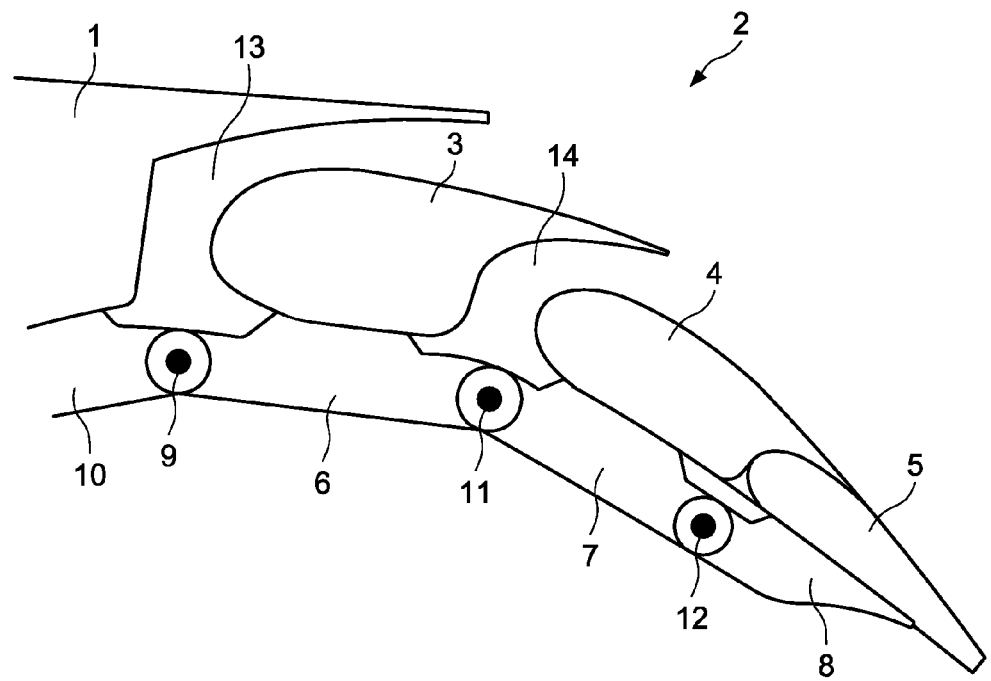
FIG. 3 illustrates the flap arrangement in a double slotted configuration.

Turning now to FIG. 3, the flap arrangement 2 is shown in a double slotted configuration. The position of the leading flap element 3 is unchanged from the single slotted configuration, and hence slot 13 remains. The intermediate and trailing flap elements 4 and 5 remain sealed together as a unitary flap profile which is deployed by rotating intermediate flap support 7 downwardly about intermediate hinge point 11. The hinge point 11 is similar to hinge point 9 and so functions as a drop hinge. No rotation about hinge point 12 occurs in moving from the single slotted to the double slotted configuration. A through slot 14 is opened up between the leading flap element 3 and the intermediate flap element 4 by rotation about hinge point 11. The double slotted flap configuration shown in FIG. 3 enables more high pressure air from the lower wing surface to pass through slots 13 and 14 to further aid in postponing stall over the flap arrangement 2.

Figure 4:
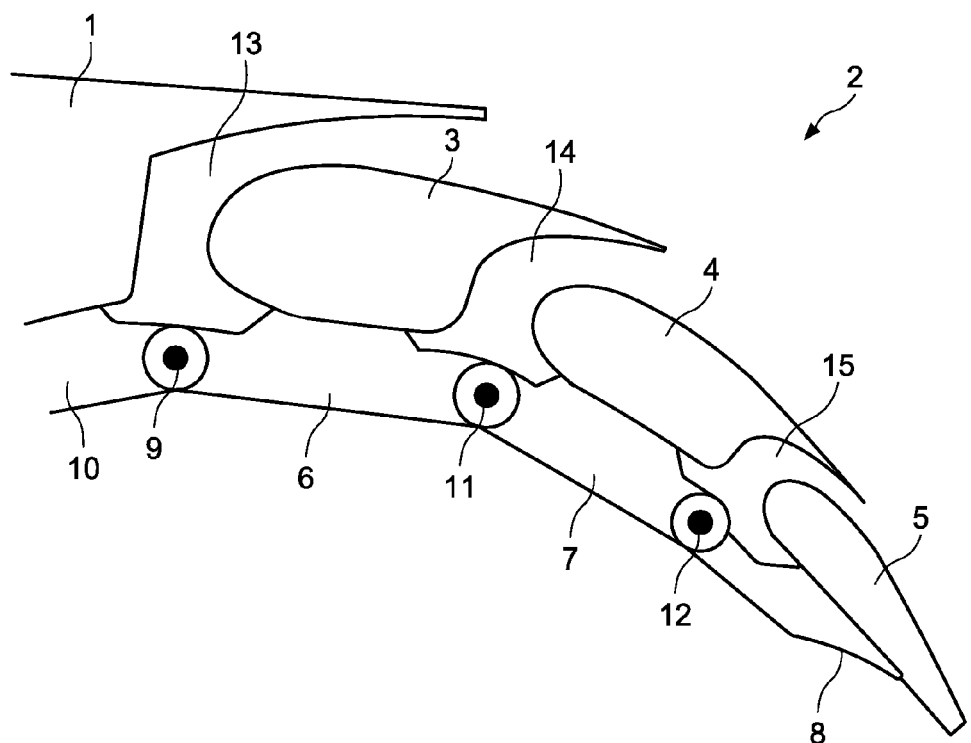
FIG. 4 illustrates the flap arrangement in a triple slotted configuration.

FIG. 4 shows the flap arrangement 2 in a triple slotted configuration. The position of the leading and intermediate flap elements 3 and 4 is unchanged from the double slotted configuration, and hence slots 13 and 14 remain. The trailing flap element 5 is deployed by rotating it downwardly about trailing hinge point 12. The hinge point 12 is similar to hinge points 9 and 11 and so functions as a drop hinge. A through slot 15 is opened up between the intermediate flap element 4 and the trailing flap element 5 by rotation about hinge point 12. The triple slotted flap configuration shown in FIG. 4 enables yet more high pressure air from the lower wing surface to pass through slots 13, 14 and 15 to further aid in postponing stall over the flap arrangement 2.

The retracted configuration may be used in cruise, the single or double slotted configurations may be used for take off (double slotted probably only for heavy take off), and the triple slotted configuration may be used for landing.

As can be seen from FIGS. 1 to 4, an extra slot is opened up in the flap arrangement 2 each time there is rotation about the hinge points 9, 11, 12. The rotation occurs consecutively from about the leading hinge point 9 to about the trailing hinge point 12. In other words, rotation about intermediate hinge point 11 can only occur after the leading flap element 3 has been moved to its fully extended (deployed) position by rotation about leading hinge point 9. Similarly, rotation about trailing hinge point 12 can only occur after the intermediate flap element 4 has been moved to its fully extended (deployed) position by rotation about intermediate hinge point 11.

The angular rotation about each hinge point 9, 11, 12 is limited. Rotation about each hinge 9, 11, 12 is limited in the anti-clockwise direction (as viewed in the Figures) by nesting of the flap elements 3, 4, 5 in the retracted configuration. The leading flap element 3 nests against the fixed wing portion 1 to seal slot 13. The intermediate flap element 4 nests against the leading flap element 3 to seal slot 14. The trailing flap element 5 nests against the intermediate flap element 4 to seal slot 15. Rotation about each hinge 9, 11, 12 is limited in the clockwise direction to a predetermined angle at which the various slotted configurations shown in FIGS. 2 to 4 are optimized.

It is to be noted that the orientation of the leading flap element 3 in its fully extended position (i.e. at its limit of clockwise rotation) is only optimised for the single slotted configuration. Likewise, the orientation of the intermediate flap element 4 in its fully extended position is only optimised for the double slotted configuration. And, the orientation of the trailing flap element 5 in its fully extended position is only optimised for the triple slotted configuration. In other words, the orientation of the flap elements 3, 4, 5 is only truly optimized for the single slotted configuration where the flap elements are sealed together. In the double and triple slotted configurations, at least one of the flap elements 3 and/or 4 will be in a sub-optimal orientation. However, the simplicity of having only a single deployment angle for each flap element 3, 4, 5 provides weight and maintenance benefits to sufficiently outweigh this slight loss of performance.

Figure 5:
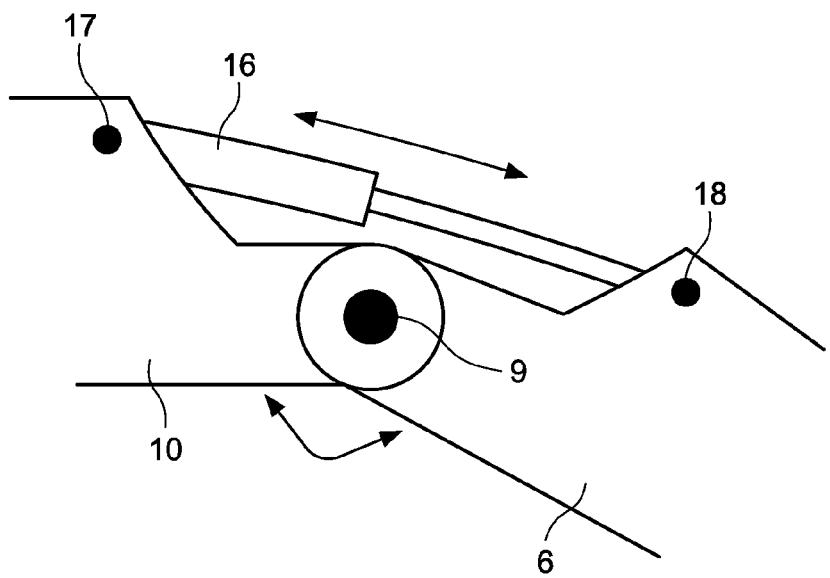
FIG. 5 illustrates a drive mechanism for deploying the flap elements.

The simple hinge kinematics enable use of a lightweight drive mechanism for deploying the flap elements 3, 4, 5. FIG. 5 illustrates the drive mechanism between the fixed strut 10 and the leading flap support 6, which rotates about hinge point 9. Similar drive mechanisms are used between the leading and intermediate flap supports 6 and 7, and the intermediate and trailing flap supports 7 and 8.

As can be seen from FIG. 5, the drive mechanism includes a linear actuator 16 pivotally connected at each end 17, 18 to the fixed strut 10 and the leading flap support 6, respectively, above the hinge point 9. The assembly is shown in the deployed position with the flap support 6 at its clockwise limit of rotation about the hinge point 9, and the linear actuator 16 fully extended. Retraction of the actuator 16 causes the flap support 6 to rotate relative to the strut 10 in an anticlockwise sense (as shown in FIG. 5) to its anticlockwise limit of rotation about the hinge point 9. The linear actuator 16 is hydraulic. The actuator 16 is discretely moved between its retracted and extended positions and as such operates as a ram actuator. The actuator 16 is controlled in a conventional manner for aircraft hydraulic actuators, and so will not be elaborated here. The actuator 16 itself may define the extent of deployment of the leading flap element 3, or an end stop may be provided in the hinge point 9 to limit the clockwise rotation.

The leading hinge point 9 is located further forward and higher (i.e. closer to the fixed trailing edge) that would be the case for a conventional single slotted drop hinge flap. This is possible due to the fact that the flap arrangement 2 includes multiple hinge points 9, 11, 12 and can be deployed as a single, double or triple slotted configuration. The individual flap element drive mechanisms are also smaller than the drive mechanism required for a conventional single slotted drop hinge flap. The locations of the hinge points 9, 11, 12 and the size of the drive mechanisms beneficially enable a much smaller fairing (not shown in the Figures) to be used to cover these parts of the flap arrangement 2 than would be the case for a conventional single slotted drop hinge flap. This significantly reduces drag, particularly in the cruise, and so provides performance benefits and reduces fuel burn for the aircraft as a whole.

Retraction of the flap arrangement 2 to the retracted configuration illustrated in FIG. 1 is by rotating the flap elements 3, 4, 5 anticlockwise about their respective hinge points 9, 11, 12 to their limit of rotation consecutively starting with the trailing flap element 5, then the intermediate flap element 4, and finally the leading flap element 3.

Whilst in the preferred embodiment described above the drive mechanism actuators are linear actuators, it is envisaged that the actuators could instead be rotary actuators for rotating the flap supports about their hinge points.

Figure 6:
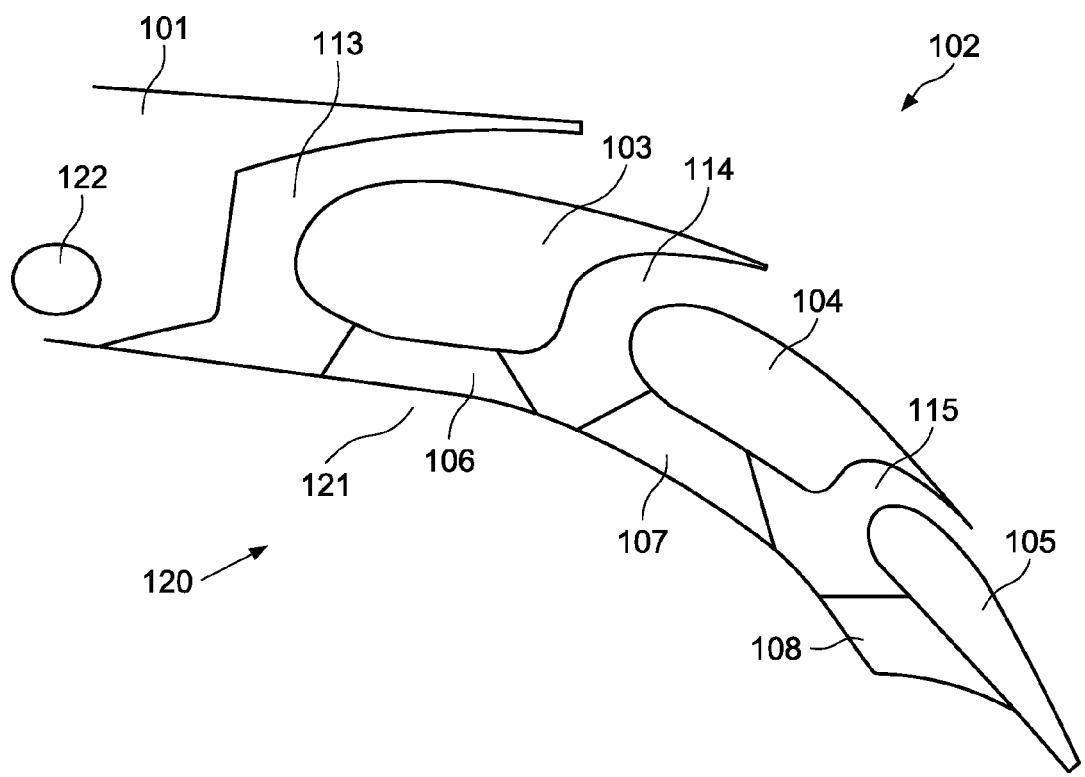
FIG. 6 illustrates an alternative embodiment of a flap arrangement, shown in a triple slotted configuration.

Also, whilst in the preferred embodiment a linkage arrangement is used for deploying the flap elements, the flap element motion described above could equally be embodied in a tracked kinematic. FIG. 6 illustrates this alternative embodiment of the present invention. The wing shown in FIG. 6 has many features in common with the embodiment described with reference to FIGS. 1 to 5 and similar components are denoted by similar reference numerals but numbered in the 100 series. The only difference between the embodiment of FIG. 6 and the embodiment of FIGS. 1 to 5 is that the linkage arrangement is omitted and the array of flap elements 103, 104, 105 is supported by a kinematic track mechanism 120 for movement relative to the fixed wing portion 101. The array of flap elements 103, 104, 105 are supported by track 121 which is moved between retracted and extended positions by rotary actuator 122.

As the track 121 is deployed from its retracted position, it carries the flap elements 103, 104, 105 until each reaches its fully extended position. As with the linkage arrangement, the flap elements 103, 104, 105 move collectively, sealed together, thus opening up slot 113 and creating a single slotted flap. Further deployment of the track 121 causes the flap elements 104 and 105 to deploy as a unitary flap profile opening up slot 114 until the flap element 104 reaches its fully extended position, creating a double slotted flap. Finally, maximum deployment of the track 121 causes the flap element 105 to open up slot 115 until the flap element 105 reaches its fully extended position, creating a triple slotted flap.

Whilst FIG. 6 depicts the flap arrangement 102 in its triple slotted configuration it will be appreciated by those skilled in the art that the retracted, single slotted and double slotted configurations for the flap elements 103, 104 and 105 are substantially identical to those positions of the corresponding components of the flap arrangement depicted in FIGS. 1 to 5.

Although the invention has been described above with reference to one or more preferred embodiments, it will be appreciated that various changes or modifications may be made without departing from the scope of the invention as defined in the appended claims.

The invention claimed is:

1. A trailing edge flap arrangement for an aircraft wing, comprising an array of flap elements each discretely moveable between a retracted and an extended position, wherein the flap elements are arranged to be deployed so as to open up a through slot between an adjacent pair of the flap elements only when the aerodynamic leading element of the pair has reached its extended position, and wherein a first hinge point is disposed between the wing and the aerodynamic leading flap element in the array, and a first ram actuator is connected between the wing and the aerodynamic leading flap element across and above the first hinge point for rotating the aerodynamic leading flap element about said first hinge point, and wherein a second hinge point is disposed between the aerodynamic leading flap element and an adjacent aerodynamic trailing flap element aft of the aerodynamic leading flap element, and wherein said aerodynamic leading flap element and aerodynamic trailing flap element are rotatably connected to one another at said second hinge point, and a second ram actuator is connected between said aerodynamic leading flap element and said aerodynamic trailing flap element across and above the second hinge point for rotating the aerodynamic trailing flap element about said second hinge point.

2. A flap arrangement according to claim 1, wherein a through slot is opened up between the wing and the aerodynamic leading flap element in the array when the leading element is in its extended position.

3. A flap arrangement according to claim 1, further comprising a linkage arrangement supporting the array of flap elements from the aircraft wing for movement relative to the wing.

4. A flap arrangement according to claim 3, wherein the linkage arrangement includes a plurality of flap supports each for supporting a respective flap element.

5. A flap arrangement according to claim 1, wherein the array of flap elements includes at least three flap elements, and a respective hinge point is disposed between each adjacent pair of flap elements, and a ram actuator is connected between each said adjacent pair of flap elements across the respective hinge point for rotating the aerodynamic trailing element of said pair of flap elements about said respective hinge point.

6. A flap arrangement according to claim 4, wherein each flap element is rotatable about a respective hinge point, and wherein adjacent flap supports are pivotally connected by one of the hinge points.

7. A flap arrangement according to claim 1, wherein adjacent flap elements are moveable between a first position in which the flap elements are sealed together, and a second position in which a through slot is opened up between the flap elements.

8. A flap arrangement according to claim 1, wherein a through slot is opened up between each adjacent pair of flap elements when all of the elements are in their extended position.

9. A flap arrangement according to claim 1, wherein the array includes three elements.

10. A method of operating a trailing edge flap arrangement on an aircraft wing, the flap arrangement including an array of flap elements each discretely moveable between a retracted and an extended position, wherein a first hinge point is disposed between the wing and the aerodynamic leading flap element in the array, and a first ram actuator is connected between the wing and the aerodynamic leading flap element across and above the first hinge point for rotating the aerodynamic flap element about said first hinge point, and wherein a second hinge point is disposed between the aerodynamic leading flap element and an adjacent aerodynamic trailing flap element aft of the aerodynamic leading flap element, and wherein said aerodynamic leading flap element and aerodynamic trailing flap element are rotatably connected to one another at said second hinge point, and a second ram actuator is connected between said aerodynamic leading flap element and said aerodynamic trailing flap element across and above the second hinge point for rotating the aerodynamic trailing element of said second hinge point, the method comprising deploying the flap elements so as to open up a through slot between said adjacent pair of the flap elements only when the aerodynamic leading element of the pair has reached its extended position.

11. A method according to claim 10, further comprising adjusting the flap arrangement to a first configuration in which the array of flap elements are sealed together and in their retracted position.

12. A method according to claim 10, further comprising adjusting the flap arrangement to a second configuration in which the array of flap elements are sealed together and the aerodynamic leading flap element in the array is in its extended position so as to provide a single slotted flap.

13. A method according to claim 10, further comprising adjusting the flap arrangement to a third configuration in which each of the flap elements are in their extended position so as to provide a multi-slotted flap, with a through slot between each adjacent pair of the elements.

14. A method according to claim 10, wherein the array includes three elements, and the method further comprises adjusting the flap arrangement to a fourth configuration in which each of the elements in the array, except the trailing element, is in its extended position so as to provide a double slotted flap.

15. A method according to claim 10, wherein the array of flap elements includes at least three flap elements, and a respective hinge point is disposed between each adjacent pair of flap elements, and a ram actuator is connected between each said adjacent pair of flap elements across the respective hinge point, and the method includes rotating the aerodynamic trailing element of said pair of flap elements about said respective hinge point.

* * * * *